Patented Mar. 7, 1950

2,499,983

UNITED STATES PATENT OFFICE 2,499,983

POLYESTER LUBRICANTS

Ellington M. Beavers, Philadelphia, Pa., assignor to Rohm & Haas Company, Philadelphia, Pa., a corporation of Delaware No Drawing. Application December 16, 1948, Serial No. 65,715

12 Claims. (Cl. 260—404.8)

This invention relates to bland, oily complex esters having low freezing points, low volatility, high flash and fire points, viscosities favorable for lubricating and good viscosity-temperature relationships. It also concerns a process for preparing these complex esters. It deals, furthermore, with lubricants and lubricating compositions based on these complex esters and methods of lubricating with these compositions.

Considerable effort has been expended in the quest for a liquid which would be fluid at relatively low temperatures, yet not be readily volatile, and at the same time possess lubricating properties and viscosities over a range of temperatures which would render the fluid useful as a lubricating medium over this range. Hydrocarbons which exhibit low pour points tend to be excessively volatile and have flow flash and fire points. Hydrocarbons which remain fluid at temperatures much below 0° F. lack body and lubricity. Various synthetic chemicals have been suggested to replace hydrocarbons as lubricants and, indeed, some of these present definite advantages over hydrocarbon liquids for specific applications. Even so, there remains much to be desired in the best of the chemical compounds which have thus far been suggested to serve as lubricants.

With regard to materials which have previously been made through utilization of the ester linkage, there are on the one hand resins of the alkyd type and on the other simple or mixed carboxylic esters, both of which lack the properties provided by the compounds of the present invention. Neither the choice of reactants of the prior art nor the mode of their combination permits manufacture of products having the combination of properties now made possible through the present invention.

To produce bland, oily complex esters having the combination of properties recited above, it is necessary to take the dibasic acids, glycols, and monobasic acids which are defined below, to mix them in proportions providing an excess of the glycol on the basis of equivalents, to react them by heating to promote esterification and then transesterification, taking off the excess of glycol, to heat the reaction mixture to 170° C. to 225° C., preferably 200° C. to 220° C., and to reduce the pressure of the reaction mixture at this temperature range below 30 mm. The reaction is continued until the resulting product has an acid number approaching zero. For practical purposes the reaction is carried on until the acid and hydroxyl numbers are individually less than two.

During the reaction, glycol is distilled out of the reaction mixture as it is heated and heating is continued until the product, as shown by its saponification equivalent, contains residues of monobasic acid, glycol, and dibasic acid in proportions such that the condition is fulfilled as defined by the equation $$n \doteq \frac{2N_A}{N_L} \qquad (I)$$

This equation dictates that the general formula for the average molecule of product shall be $$L-G-(A-G)_n-L \qquad (II)$$

where L represents a monobasic acid residue, G a glycol residue, and A a dibasic acid residue. In Equation I $N_A$ represent moles of dibasic acid, $N_L$ moles of monobasic acid, and $n$ is a number having the same value as $n$ in Formula II for the average molecule, varying from 0.5 to 7.5. It is apparent from inspection of Formula II that the average molecular weight of the products is given by the relationship $$W = nw_{AG} + w_{LGL} \qquad (III)$$

where W is the average molecular weight, $w_{AG}$ is the sum of the atomic weights in the repeating unit, A-G, and $w_{LGL}$ is the sum of atomic weights in the unit L-G-L. The values for $n$ in all the above relationships and of W can be determined experimentally very simply by determining the saponification equivalent of the product. If SE is the saponification equivalent found, then $$n = \frac{w_{LGL} - 2(SE)}{2(SE) - w_{AG}} \qquad (IV)$$

It is essential to this invention in order to realize the unusual properties of these complex esters as lubricants that the average molecular weight of the products (as described above) be in the range of 500–3000, using monobasic acids, glycols, and dibasic acids of the particular kinds specified below.

The acids which are used in forming the products of this invention are acyclic, saturated, aliphatic, dicarboxylic acids of six to ten carbon atoms, HOOCRCOOH, wherein R is an alkylene chain of at least four carbon atoms. Typical of these are adipic, pimelic, suberic, azelaic, and sebacic. Mixtures of two or more of these acids may be used.

The glycols which are used are acyclic, saturated, non-tertiary, dihydric alcohols of seven to ten carbon atoms in branched chain arrangement. Of such glycols, those available through common reactions are primarily 1,3-diols and these are particularly useful for the preparation of the products of this invention. Typical glycols which may be used are:

2-ethyl-1,3-pentanediol,
2,4-dimethyl-1,3-pentanediol,
2,2-diethyl-1,3-propanediol,
2-isopropyl-2-methyl-1,3-propanediol,
2-isobutyl-2-methyl-1,3-propanediol,
2-tert.-butyl-2-methyl-1,3-propanediol,
2-ethyl-2-isopropyl-1,3-propanediol,
2-ethyl-1,3-hexanediol,
2-isopropyl-1,3-pentanediol,
2-ethyl-4-methyl-1,3-pentanediol,
2,5-dimethyl-1,3-hexanediol,
2-methyl-1,3-octanediol,
2-ethyl-1,3-heptanediol,
2-isopropyl-1,3-hexanediol,
2-ethyl-2-tert.-butyl-1,3-propanediol,
2-methyl-2-neopentyl-1,3-propanediol,
2-amyl-2-ethyl-1,3-propanediol,
2-tert.-butyl-2-isopropyl-1,3-propanediol,
2-isopropyl-4,4'-dimethyl-1,3-pentanediol, and
2-hexyl-2-methyl-1,3-propanediol.

In these glycols the alcoholic hydroxyl groups are attached at primary or secondary carbon atoms and the carbon atoms are in branched chain arrangement relative to the position of hydroxyl groups. Many of the glycols illustrated are obtainable from olefins through the "oxo" reaction with carbon monoxide and hydrogen and reaction of the intermediate aldehyde with formaldehyde. Mixtures of glycols may be used as well as single glycols.

Typical of the monobasic, saturated, aliphatic, carboxylic acids of six to nine carbon atoms in branched chain arrangement are the following:

Isocaproic,
Methyl-n-propylacetic,
Sec.-butylacetic,
Alpha-ethylbutyric,
Alpha,alpha-dimethylbutyric,
Beta,beta-dimethylbutyric,
Alpha,beta-dimethylbutyric,
Isoheptoic (isoenanthic)
Gamma-methylcaproic,
Beta-methylcaproic,
Alpha-methylcaproic,
Neopentylacetic,
Beta,gamma-dimethylvaleric,
Alpha,gamma-dimethylvaleric,
Alpha,alpha,gamma-trimethylvaleric,
Alpha,gamma,gamma-trimethylvaleric,
Beta,gamma,gamma-trimethylvaleric,
Beta-methylisoenanthic,
Alpha,alpha,beta,beta-tetramethylbutyric,
Alpha-ethyl-beta,beta-dimethylbutyric,
Beta,beta-dimethylcaproic,
Alpha-isopropyl-beta,beta-dimethylbutyric,
Alpha,delta,delta-trimethylhexoic,
Beta,delta,delta-trimethylhexoic,
Alpha,alpha,gamma,gamma-tetramethylvaleric,
Alpha-isopropyl-beta-methylvaleric.

These acids may be used as single, pure acids or as mixtures. Many of the acids are obtainable by oxidation of aldehydes produced by the "oxo" reaction of olefins with carbon monoxide and hydrogen in the presence of a cobalt catalyst.

The initial charge to the reaction vessel comprises the three reactants, monobasic carboxylic acid, R'COOH, dibasic carboxylic acid,

HOOCRCOOH, and glycol, HOR"OH. The moles of dibasic acid taken per mole of monobasic acid may be varied from 0.25 to 3.8. The exact number of moles of glycol required to react with these acids to yield the products of this invention is determined by the equation $$\frac{N_L + 2N_A}{2} = N_G \qquad (V)$$

where, as before, $N_L$ represents moles of monocarboxylic acid, $N_A$ represents moles of dicarboxylic acid, and $N_G$ represents moles of glycol. An excess of glycol up to 50%, preferably 10% to 50%, over that calculated may be placed in the reaction mixture. The amount of glycol taken will, therefore, vary from 0.8 mole of glycol per mole of monocarboxylic acid up to about six moles of glycol per mole of said acid, depending upon the moles of dicarboxylic acid used and excess taken. Excess glycol is distilled out during the course of the reaction and the final product contains the moles of residues shown by Equation V.

In the above formulae R represents an alkylene group of four to eight carbon atoms, R' represents a branched chain alkyl group of five to eight carbon atoms, and R" represents a branched alkylene group of seven to ten carbon atoms. The residues of the acids and the glycol; i. e., that portion of the molecule which remains when the characterizing atom or group is removed, are R'COO— for the monocarboxylic acid, —OCORCOO— for the dicarboxylic acid, and —R"— for the glycol.

The early stages of reaction may be favorably carried through with the aid of volatile solvents, such as benzene, toluene, xylene, close-cut naphthas, chlorinated solvents, and the like. These assist in removal of water of esterification through azeotropic distillation. When they have served their purpose, they are distilled from the reaction mixture, which is then taken to its final temperature under reduced pressure.

The reaction of monobasic acid, glycol, and dibasic acid may be hastened by addition to the reacting mixture of small amounts (0.1% to 1%) of an acidic catalyst, such as zinc chloride, sodium acid sulfate, p-toluene sulfonic acid, etc. Air may be excluded from the reaction mixture by sweeping out the apparatus with a gas such as hydrogen or nitrogen. The reaction is started usually by heating to reflux temperatures and then continuing the heating, taking off volatile materials, including azeotropic mixtures, and reducing the pressure as rapidly as conditions will permit. At the end point of about 200° C. to 220° C. the pressure in the reaction vessel is preferably carried down to 1 mm. to 15 mm.

Typical methods of preparing the complex esters of this invention and data on properties are given in the following examples.

*Example 1*

There were charged to a reaction vessel equipped with stirrer and reflux condenser controlled at 100° C. with steam 146 grams of adipic acid, 360 grams of 2-ethylhexanediol-1,3, and 465 grams of isononanoic acid, 0.6 gram of zinc chloride being used as a catalyst. (Equations I and III show that the theoretical average molecular weight of the product will be 600.) The reaction mixture was heated to maintain a moderate, steady rate of distillation with reflux of the glycol. The condenser permitted water vapor and any pyrolysis products of the glycol to pass. The temperature of the batch at the start of water distillation was 172° C. The temperature was gradually increased until at the end of two hours the temperature of 200° C. was reached. While the reaction mixture was held at this temperature, the pressure was gradually reduced, so that in 13.4 hours the pressure was 28 mm. The acid-number of the product at this intermediate stage was 8.56. The steam-cooled condenser was now replaced with an arrangement for total take-off of vapors, the pressure was reduced to 3 mm., and the temperature of the batch was raised to 220° C. After four hours under these conditions, the batch was cooled and filtered.

The saponification equivalent of the product was found to be 180.3. Substituting this value into Equations IV and III, one finds the average molecular weight to be 608, in excellent agreement with the theoretical value. The acid number was 1.06 and the hydroxyl number was 1.5.

The product is an oily liquid, light in color, having viscosities of 10.91 centistokes at 210° F., 95.91 centistokes at 100° F., and 12,200 centistokes at 0° F. and does not freeze when held at —75° F. for 24 hours. The Dean-Davis viscosity index is 106. When subjected to oxidation tests, there is a small increase in acid number and viscosity, but no sludge forms. Furthermore, common antioxidants effectively stabilize this product.

The product is miscible with hydrocarbon oils, which may be used to give lubricants of lower or higher viscosities than that of the product alone. The product gives low rates of wear and sustains considerable loads. In the Falex Lubricant Tester it gives wear at less than 3 mg./hr. and supports a load of over 250 lbs. These values may be further improved by addition of film-forming compounds or wear-resisting agents.

Example 2

There were charged to the reaction vessel 146 grams of adipic acid, 360 grams of 2-ethylenehexanediol-1,3 and 382 grams of isoheptanoic acid. As catalyst, 0.6 gram of zinc chloride was added. The reaction mixture was heated and a constant rate of distillation of water was maintained until, after four hours, 200° C. was attained. Distillation started at 164° C. batch temperature. After the temperature of the batch reached 200° C., the pressure was gradually lowered to 25 mm. over a period of 12.5 hours. After the equipment was changed for full take-off of vapors, the pressure was lowered to 1 mm., and the temperature held at 220° C. for four hours. The resulting oil had an acid number of 1.12. Its theoretical average molecular weight was 544; that found by saponification equivalent was 550.

Viscosities were determined as follows: At 210° F., 13.35 cs.; at 100° F., 119.5 cs.; at 0° F., 12,500 cs. The viscosity index (D-D) is 113. The product does not freeze at —75° F. It has a flash point of 480° F. and a fire point of 525° F.

When subjected to oxidation in the presence of copper-lead and cadmium-nickel bearings, no sludge was formed, the acid number increased very slightly, and the 100° F. viscosity was increased only seven per cent. When a sample treated with a conventional stabilizer, a condensate of phosphorus pentasulfide and unsaturated compounds, was similarly subjected to oxidation, essentially no change was observed in any property of the fluid.

The substitution of sebacic acid for adipic acid yields a product of the same general properties, except that the viscosity index is increased to 133. Substitution of azelaic acid likewise gives an oily complex ester which does not freeze at —75° F. and yet has a flash point of approximately 500° F. and which has a viscosity index of 125.

Example 3

The importance of using branched-chain acids of the type specified is shown by the following. In the manner described above, 202 grams of sebacic acid, 360 grams of 2-ethylhexanediol-1,3, 588 grams of lauric acid, and 0.6 g. of zinc chloride were reacted together. The product has a viscosity index of 133 but freezes above 0° F.

Similarly, a product from adipic acid, isoheptanoic acid, and propylene glycol freezes at a temperature higher than 0° F.

Example 4

By the procedure described above there were mixed 379 grams of sebacic acid, 79 grams of mixed isononanoic acids, and 457 grams of a mixture of 1,3-alkanediols having a total of ten carbon atoms in branched-chain arrangements obtained from the "oxo" reaction of diisobutylene followed by reaction with formaldehyde. There was added 0.8 gram of zinc chloride as a catalyst. Water was distilled out for five hours and the batch was then heated under reduced pressure for 14 hours, the final temperature at 20 mm. being 220° C. The acid number was about one. The saponification equivalent was 176.9. The apparent molecular weight was about 2900. The viscosity at 210° F. was 14 cs. The product did not freeze when stored at —75° F. for 24 hours. It was oily and bland and entirely suitable for lubricating at both high and low temperatures. Seizure in the Falex tester was above 2250 lbs.

The oily liquids of this invention may be modified by solution therein of polymeric substances. They serve to body the liquids and to give exceptionally favorable viscosity-temperature relationships of the resulting solutions in many cases. Among the most effective of such additives are the acrylic resins and linear polyesters of high molecular weight.

The acrylic and methacrylic acid esters which are soluble and effective in the liquids of this invention are those from saturated aliphatic monohydric alcohols of four up to eighteen carbon atoms. Copolymers of two or more esters are useful and, in fact, often preferable. The molecular size of the various polymers may be varied greatly. The high polymers give the most marked effects while the low polymers are least influenced by shear.

Example 5

A fluid was prepared in the manner described in the foregoing, using azelaic acid, isononanoic acid, and 2-ethyl-2-butyl propanediol-1,3, which was found to have at 210° F. a viscosity of 9 cs. To this fluid was added 2.5% of a polymer of propylene sebacate of about 25,000 average molecular weight. The solution exhibited the following viscosities: 12.10 cs. at 210° F.; 70.02 cs. at 100° F.; 2150 cs. at 0° F.

The fluids of this invention are useful for the preparation of greases with metallic soaps such as lithium, calcium, or aluminum stearates, or mixtures thereof.

The complex esters of this invention serve as base fluids which can be adjusted to almost any need. They may be thinned with simple esters such as dioctyl sebacate, dioctyl adiphate, diheptyl azelate, dibutyl sebacate, dicapryl phthalate, polyethers including hetero-ethers, etc. They may be used in conjunction with hydrocarbons. They may be thickened with polymeric materials or metal soaps.

Whether the fluids of this invention are used alone or as one component of a mixture, they carry with them the advantages of their unique properties. Their low pour points are particularly important when taken in conjunction with their low volatility. The latter determines their high flash and fire points. These fluid have excellent viscosity properties and by themselves suffer no loss in viscosity from shear. The viscosity behavior at low temperatures is exceptionally good, since the viscosity-temperature curve is almost linear. There is absent the so-called "low temperature hook" which seems characteristic of most liquids which have been suggested to serve as lubricants. The fluids provide good lubricating action and support greater loads than hydrocarbon oils of the same viscosity or pour point ranges. In short, they possess a combination of properties which recommend them highly for a great variety of applications.

The products which result from these reactants condensed within the specified proportions to an acid number approaching zero are a complex mixture, the apparent or average molecular weight of which rests on choice of components and proportions. The distribution of individual molecular sizes in a given product may be represented by a rather peaked, bell-shaped curve or probability curve. The relative location of the peak of this curve varies with proportions used but products prepared from the recited ratios of the designated components all possess the unusual properties which have been related above and which distinguish them from condensates known heretofore.

I claim:

1. A bland, oily product which is a condensate of (1) a saturated, aliphatic, monocarboxylic acid of six to nine carbon atoms in branched-chain arrangement, R'COOH, (2) an acyclic, saturated, non-tertiary glycol of seven to ten carbon atoms in branched-chain arrangement, HOR"OH, and (3) an acyclic, saturated, aliphatic, dicarboxylic acid of six to ten carbon atoms, HOOCRCOOH, the molar ratio of the residue of said dicarboxylic acid to said monocarboxylic acid in said condensate being from 0.25 to 3.8:1 and the proportion of residue of said glycol being defined by the relationship $$\frac{N_L + 2N_A}{2} = N_G$$

where $N_L$ represents moles of monocarboxylic acid, $N_A$ represents moles of dicarboxylic acid, and $N_G$ represents moles of glycol, and wherein the above formulae R represents an alkylene group of four to eight carbon atoms, R' represents a branched-chain alkyl group of five to eight carbon atoms, and R" represents a branched alkylene group of seven to ten carbon atoms.

2. A bland, oily product which is a condensate of (1) a saturated, aliphatic, monocarboxylic acid of six to nine carbon atoms in branched-chain arrangement, R'COOH, (2) an acyclic, saturated, non-tertiary, 1,3-alkanediol of seven to ten carbon atoms in branched-chain arrangement, HOR"OH, and (3) an acyclic, saturated, aliphatic, dicarboxylic acid of six to ten carbon atoms, HOOCRCOOH, the molar ratio of the residue of said dicarboxylic acid to said monocarboxylic acid in said condensate being from 0.25 to 3.8:1 and the proportion of the residue of said 1,3-alkanediol being defined by the relationship $$\frac{N_L + 2N_A}{2} = N_G$$

where $N_L$ represents moles of monocarboxylic acid, $N_A$ represents moles of dicarboxylic acid, $N_G$ represents moles of 1,3-alkanediol, and where in the above formulae R represents an alkylene group of four to eight carbon atoms, R' represents a branched-chain alkyl group of five to eight carbon atoms, and R" represents a branched alkylene group of seven to ten carbon atoms.

3. A bland, oily product which is a condensate of (1) a saturated, aliphatic, monocarboxylic acid of six to nine carbon atoms in branched-chain arrangement, R'COOH, where R' represents a branched alkyl group of five to eight carbon atoms, (2) 2-ethyl-1,3-hexanediol, and (3) adipic acid, the molar ratio of the residue of the adipic acid to said monocarboxylic acid in said condensate being from 0.25 to 3.8:1 and the proportion of residue of the 2-ethyl-1,3-hexanediol being defined by the relationship $$\frac{N_L + 2N_A}{2} = N_G$$

where $N_L$ represents moles of monocarboxylic acid, $N_A$ represents moles of adipic acid, and $N_G$ represents moles of 2-ethyl-1,3-hexanediol.

4. The product of claim 3 in which the monocarboxylic acid is isononanoic acid.

5. A bland, oily product which is a condensate of (1) a saturated, aliphatic, monocarboxylic acid of six to nine carbon atoms in branched-chain arrangement, R'COOH, where R' represents a branched alkyl group of five to eight carbon atoms, (2) 2-ethyl-1,3-hexanediol, and (3) sebacic acid, the molar ratio of the residue of the sebacic acid to said monocarboxylic acid in said condensate being from 0.25 to 3.8:1 and the proportion of residue of the 2-ethyl-1,3-hexanediol being defined by the relationship $$\frac{N_L + 2N_A}{2} = N_G$$

where $N_L$ represents moles of monocarboxylic acid, $N_A$ represents moles of sebacic acid, and $N_G$ represents moles of 2-ethyl-1,3-hexanediol.

6. The product of claim 5 in which the monocarboxylic acid is isoheptanoic acid.

7. A method for preparing bland, oily products having lubricating properties which comprises mixing 0.25 to 3.8 moles of an acyclic, saturated, aliphatic, dicarboxylic acid of six to ten carbon atoms, HOOCRCOOH, one mole of a saturated, aliphatic, monocarboxylic acid of six to nine carbon atoms in branched-chain arrangement, R'COOH, and an acyclic, saturated, non-tertiary glycol of seven to ten carbon atoms in branched-chain arrangement, HOR"OH, in an amount in excess but not over 50% of that determined by the relationship $$N_G = \frac{N_L + 2N_A}{2}$$

where $N_G$ represents the theoretical moles of said glycol to be reacted, $N_L$ represents moles of monocarboxylic acid taken, and $N_A$ represents the moles of dicarboxylic acid taken, esterifying said mixture by heating and removing water of esterification, and continuing the reaction by heating to a temperature of 200° C.–225° C. at a pressure below 30 mm. with removal of volatile material.

8. A method for preparing bland, oily products having lubricating properties which comprises mixing 0.25 to 3.8 moles of an acyclic, saturated, aliphatic, dicarboxylic acid of six to ten carbon atoms, HOOCRCOOH, one mole of a saturated, aliphatic, monocarboxylic acid of six to nine carbon atoms in branched-chain arrangement, R'COOH, and an acyclic, saturated, non-tertiary glycol of seven to ten carbon atoms in branched-chain arrangement, HOR''OH, in an amount in excess but not over 50% of that determined by the relationship $$N_G = \frac{N_L + 2N_A}{2}$$

where $N_G$ represents the theoretical moles of said glycol to be reacted, $N_L$ represents moles of monocarboxylic acid taken, and $N_A$ represents the moles of dicarboxylic acid taken, esterifying said mixture by heating and removing water of esterification, and continuing the reaction by heating to a temperature of 200° C.–225° C. at a pressure below 30 mm. with removal of volatile material until the acid number is less than two, and wherein the above formulae R represents an alkylene group of four to eight carbon atoms, R' represents a branched-chain alkyl group of five to eight carbon atoms, and R'' represents a branched alkylene group of seven to ten carbon atoms.

9. A method for preparing bland, oily products having lubricating properties which comprises mixing 0.25 to 3.8 moles of an acyclic, saturated, aliphatic, dicarboxylic acid of six to ten carbon atoms, HOOCRCOOH, one mole of a saturated, aliphatic monocarboxylic acid of six to nine carbon atoms in branched-chain arrangement, R'COOH, and an acyclic, saturated, non-tertiary 1,3-alkanediol of seven to ten carbon atoms in branched-chain arrangement, HOR''OH, in an amount in excess but not over 50% of that determined by the relationship $$N_G = \frac{N_L + 2N_A}{2}$$

where $N_G$ represents the theoretical moles of said glycol to be reacted, $N_L$ represents moles of monocarboxylic acid taken, and $N_A$ represents the moles of dicarboxylic acid taken, esterifying said mixture by heating in the presence of an acidic catalyst and removing water of esterification, and continuing the reaction by heating to a temperature of 200° C.–220° C. at a pressure below 30 mm. and removing volatile products therefrom until the acid number is below two, in the above formulae R representing an alkylene group of four to eight carbon atoms, R' representing a branched-chain alkyl group of five to eight carbon atoms, and R'' representing a branched alkylene group of seven to ten carbon atoms.

10. A method for preparing bland, oily products having lubricating properties which comprises mixing 0.25 to 3.8 moles of adipic acid, one mole of a saturated, aliphatic, monocarboxylic acid of six to nine carbon atoms in branched-chain arrangement, R'COOH, wherein R' represents a branched alkyl group of five to eight carbon atoms, and 2-ethyl-1,3-hexanediol in an amount in not over 50% excess of that determined by the relationship $$N_G = \frac{N_L + 2N_A}{2}$$

where $N_G$ represents the theoretical moles of 2-ethyl-1,3-hexanediol to be reacted, $N_L$ represents moles of monocarboxylic acid to be reacted, and $N_A$ represents moles of adipic acid taken, esterifying the mixture of adipic acid, said monocarboxylic acid, and 2-ethyl-1,3-hexanediol by heating it in the presence of an acidic catalyst and removing water of esterification, and continuing the reaction by heating to a temperature of 200° C.–220° C. at a pressure below 30 mm. and removing volatile products therefrom.

11. The method of claim 10 in which the monocarboxylic acid is isononanoic acid.

12. A method for preparing bland, oily products having lubricating properties which comprises mixing 0.25 to 3.8 moles of sebacic acid, one mole of a saturated, aliphatic, monocarboxylic acid of six to nine carbon atoms in branched-chain arrangement, R'COOH, wherein R' represents a branched alkyl group of five to eight carbon atoms, and 2-ethyl-1,3-hexanediol in an amount in not over 50% excess of that determined by the relationship $$N_G = \frac{N_L + 2N_A}{2}$$

where $N_G$ represents the theoretical moles of 2-ethyl-1,3-hexanediol to be reacted, $N_L$ represents moles of monocarboxylic acid to be reacted, and $N_A$ represents moles of sebacic acid taken, esterifying the mixture of sebacic acid, said monocarboxylic acid, and 2-ethyl-1,3-hexanediol by heating it in the presence of an acidic catalyst and removing water of esterification, and continuing the reaction by heating to a temperature of 200° C.–220° C. at a pressure below 30 mm. and removing volatile products therefrom.

ELLINGTON M. BEAVERS.

No references cited.